United States Patent [19]

Lu

[11] Patent Number: 5,021,060
[45] Date of Patent: Jun. 4, 1991

[54] NIPPLE ASSEMBLY WITH ALARM BUZZER AND BODY TEMPERATURE INDICATOR (II)

[76] Inventor: Jieh-Shan Lu, 56, Alley 115, Shing Her Lane, Jang Her Li, Nan Tour City, Taiwan

[21] Appl. No.: 574,135
[22] Filed: Aug. 29, 1990
[51] Int. Cl.⁵ ............................................. G01K 13/00
[52] U.S. Cl. ..................................... 606/234; 606/235; 374/151; 128/859
[58] Field of Search ...................... 606/234, 235, 236; 374/151; 128/859; 340/584, 595, 596

[56] References Cited

U.S. PATENT DOCUMENTS

| | | | |
|---|---|---|---|
| 3,634,840 | 1/1972 | Wilkinson | 340/595 |
| 3,857,285 | 12/1974 | Athey et al. | 340/595 X |
| 3,913,402 | 10/1975 | Doyle | 606/234 X |

FOREIGN PATENT DOCUMENTS

| | | | |
|---|---|---|---|
| 0166069 | 1/1986 | European Pat. Off. | 374/151 |
| 0039434 | 4/1981 | Japan | 374/151 |

*Primary Examiner*—Danton D. DeMille
*Assistant Examiner*—Brian E. Hanlon
*Attorney, Agent, or Firm*—Bacon & Thomas

[57] ABSTRACT

A nipple assembly which monitors the body temperature of a baby through an IC board, a heat sensitive resistor and a heat conductive liquid to activate a battery operated buzzer when the temperature of the liquid reaches a warning level. A heat sensing plate having plural heat reaction areas thereon provide a visual indication of the liquid temperature through a transparent magnifying cover.

1 Claim, 4 Drawing Sheets

NIPPLE ASSEMBLY WITH ALARM BUZZER AND BODY TEMPERATURE INDICATOR (II)

BACKGROUND OF THE INVENTION

This invention relates to a nipple assembly, specifically a nipple assembly with an alarm buzzer and a body temperature indicator. Within this assembly is provided a liquid of good heat conductivity, such as distilled clean water, for transferring the heat from a baby's mouth to a heat sensing plate attached to the rear end of a main case in the assembly. A plurality of heat reaction areas is provided on the plate to react with the heat of the liquid and indicate the baby's body temperature. A IC board in connection with a heat sensitive resistor immersed in the liquid is attached to the flange of the inner case. The IC board is also connected to the buzzer outside the transparent cover. When the body temperature of the baby exceeds a predetermined upper limit, the resistor causes the buzzer to issue an alarming sound. Thereby, the body temperature of the baby sucking the nipple of the assembly in accordance with the invention can be monitored to protect the baby from being harmed by overhigh body temperature which can induce other undesirable or life threatning syptoms.

Small families are the primary constituting units of the modern society in which babies are usually cared for by young busy inexperienced parents or even by the person working for a day nursery. In these circumstances, the babies' body temperatures are often neglected by their parents or the person who take care of them. Especially in a day nursery, it is hard for the person who takes care of the babies to know which baby is getting an overhigh temperature because every baby cannot have a thermometer in his mouth all the time. This commonly existing problem in the modern society constitutes a potential risk to the babies' health and lives.

Accordingly, the primary object of the invention is to provide a nipple with a body temperature indicator for a baby's daily suction, in which nipple is sealingly filled with distilled clean water or any other appropriate liquid through which the heat from the baby's mouth can be transferred to a specific indicator so that the baby's parents or the person who cares for the baby can clearly observe the baby's fluctuation in body temperature.

Another object of the invention is to provide a nipple assembly with an alarm buzzer, in which assembly is provided a heat sensitive resistor in connection with the buzzer through an IC so that the buzzer will be energized and issue an alarming sound when the temperature of the liquid in the nipple assembly reaches a warning point.

BRIEF SUMMARY OF THE INVENTION

To achieve this object, a nipple assembly with an alarm buzzer and a body temperature indicator in accordance with the invention consists of a base, a main case, an inner case, a heat sensing plate, a transparent cover, an IC board, a heat sensitive resistor, an alarm buzzer, a transparent convex housing, and a handle provided with a battery therein. The sealed space formed in said assembly is filled with a heat conductive liquid.

The case is formed as a pot-shaped thin shell with a central hole. At the open end of the pot is provided an inwardly extending circular flange. On the outer circumference of the case is provided a plurality of glue pits for accommodating a waterproof glue which is used to attach the case to the base.

The inner case is formed as a thin shell consisting of a cylindrical hollow projection and a flange. In the wall of the projection is formed a plurality of liquid guiding slots. The projection can just be fitted and adhered within the central hole of the main case.

The heat sensing plate is provided with a plurality of heat reaction areas by which the temperature of the liquid can be indicated by one of the areas which reacts at the temperature. The heat sensing plate is attached to the rear end of the main case and covered by a transparent cover, and is enclosed in the main case together with the inner case, the IC board, and the heat sensitive resistor.

A circular waterproof cover of substantially the same size as the main case is closely engaged with the inner circumference of the main case by the waterproof glue coated at the circumference of the cover so that a sealed space is defined by said cover, the base, and the main case.

The liquid is filled in the sealed space defined by the base, the main case, the inner case, the heat sensing plate, and the transparent cover so that when a baby sucks the nipple of the assembly, the heat in the baby's mouth can be transferred through the liquid to the heat sensing plate, and thus one of the areas reacts at the temperature of the heat sensing plate and indicates the baby's body temperature. Moreover, when the heat conductive liquid reaches a predetermined warning temperature, a signal from the heat sensitive resistor will be sent through the IC board to the alarm buzzer and the buzzer is energized and issues an alarming sound to attract the attention of the person who cares for the baby.

BRIEF DESCRIPTION OF THE DRAWINGS

A preferred embodiment of the invention will now be described by way of example and with reference to the accompanying drawings, in which.

DETAILED DESCRIPTION OF THE INVENTION

Figure 1:
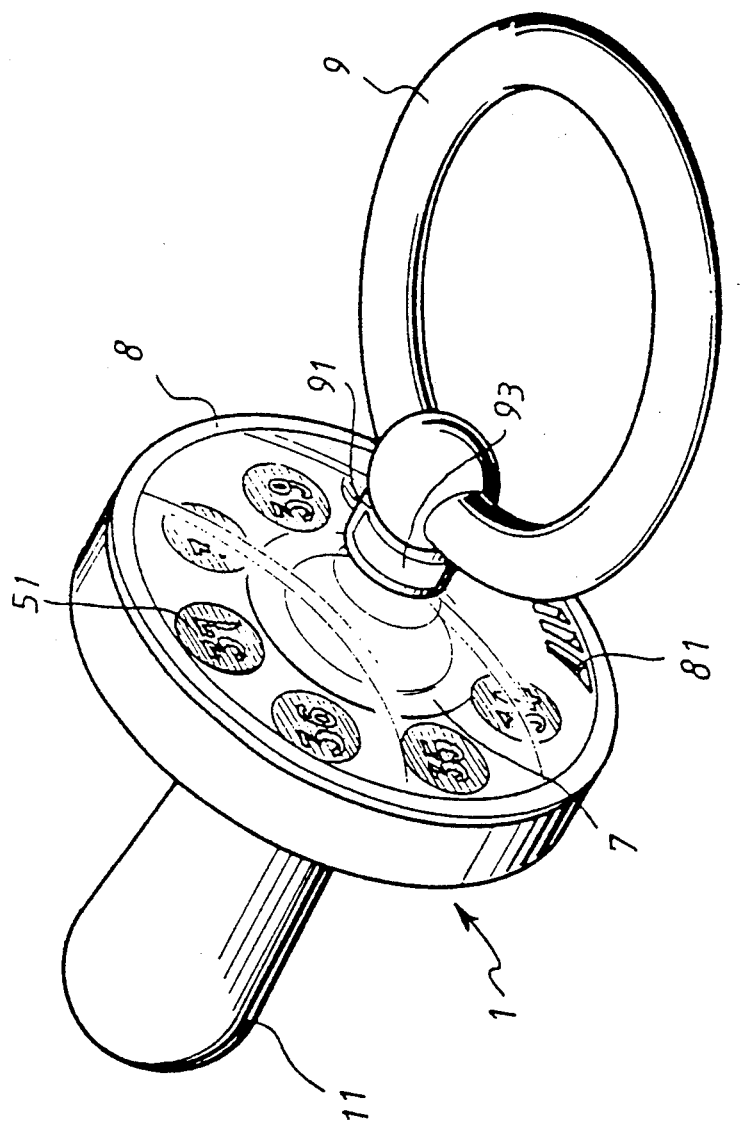
FIG. 1 is an outside view of a nipple assembly in accordance with the invention.
Figure 2:
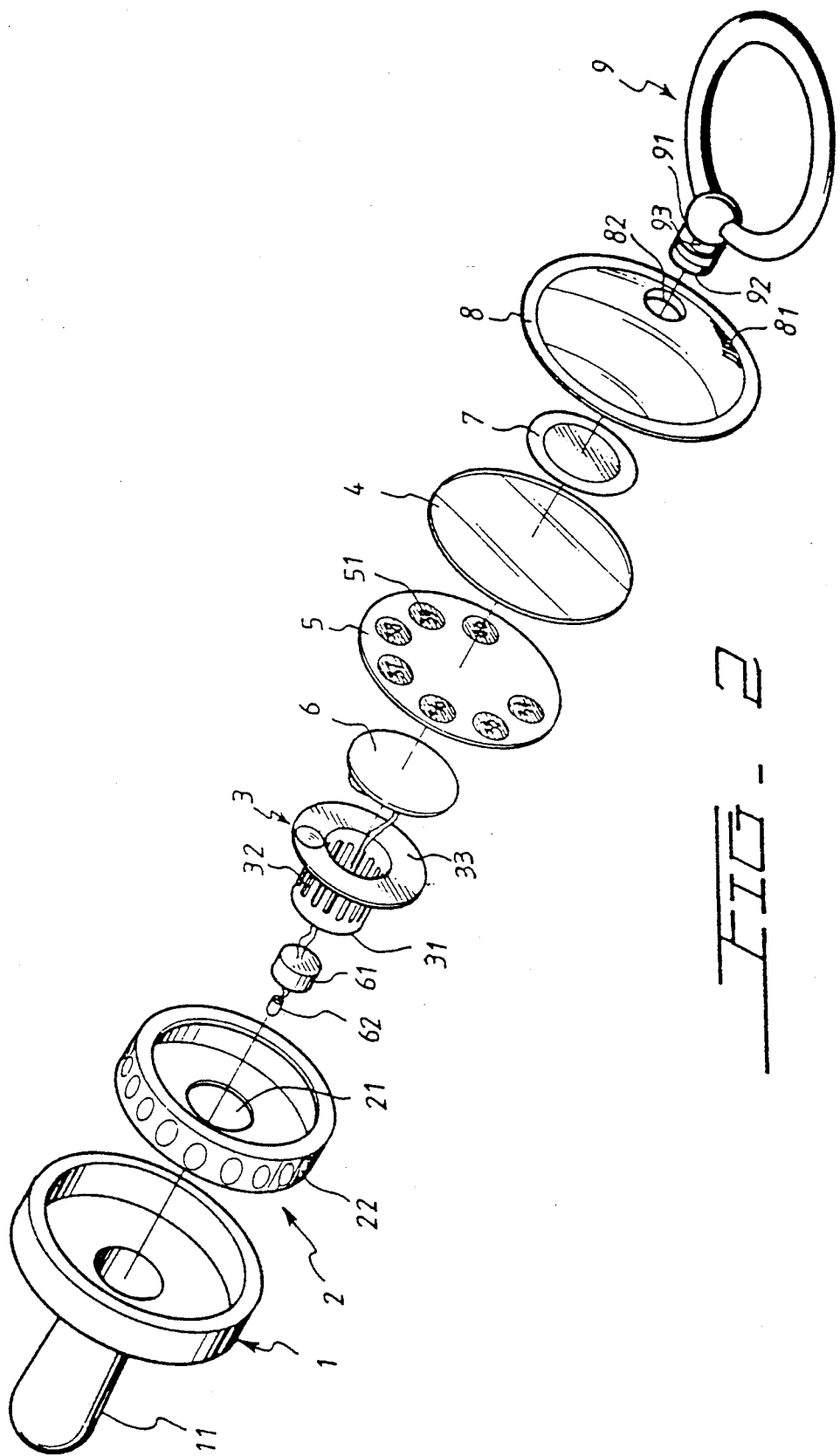
FIG. 2 is an exploded pictorial view showing the nipple assembly in accordance with the invention.

Referring to FIGS. 1 and 2, a person who faces the baby sucking a nipple of the invention can clearly observe the color indicated by the color reaction areas 51 on the temperature sensing plate 5 through the magnification effect of a transparent convex cover 8 mounted on the back of the base 1. Moreover, a plurality of sound releasing openings 81 is provided in the cover 8. When the body temperature of the baby reaches a warning point, a heat sensitive resistor 62 in the nipple assembly will become operative and consequently a buzzer 7 will issue an alarming sound through the openings 81.

Figure 3:
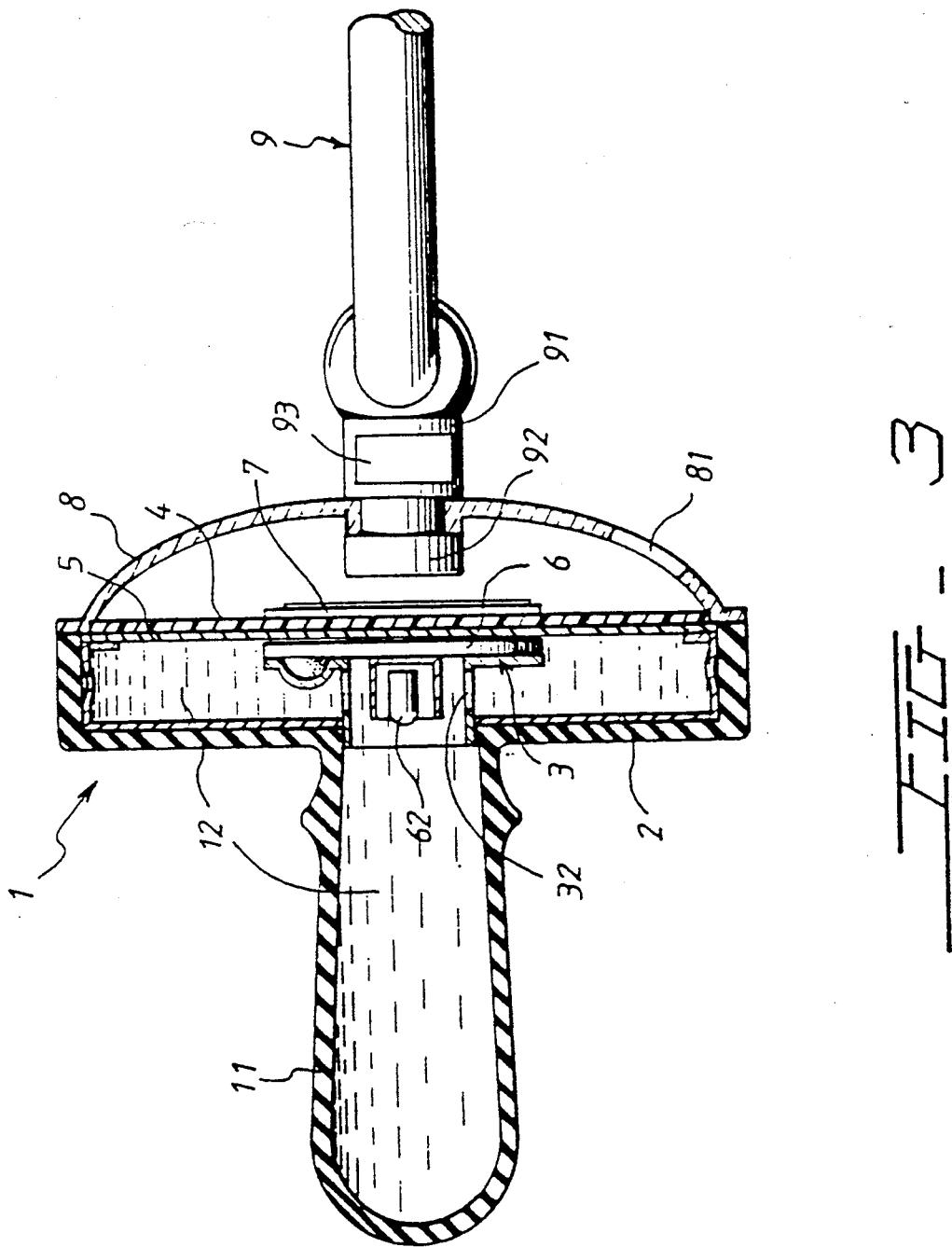
FIG. 3 is a sectional view showing the assembly in its assembled state.

Referring to FIGS. 2 and 3, the nipple assembly comprises the following primary elements: a base 1 with a nipple 11, a main case 2, and an inner case 3. The base 1 is made of a pliable material of high density and has an opening on one side for receiving the main case 2 which is formed as a disk-shaped thin shell with a central hole 21. On the circumference of the main case 2 is provided a plurality of glue pits 22 for accommodating a waterproof glue by which the main case 2 can be adhered to the base 1. The inner case 3 is formed as a thin shell consisting of a cylindrical hollow projection 31 and a flange 33. In the wall of the projection 31 is formed a plurality of liquid guiding slots 32. Moreover, the projection 31 can just be fitted within the central hole 21 of the main case 2, as shown in FIG. 3. When the projection 31 is fitted in the central hole 21, An IC board 6 sealed within a waterproof film can be attached to the rear side of the flange 33. The front side of the IC board 6 is connected to a heat sensitive resistor 62 by an enamel covered wire. The resistor 62 is disposed within a hollow protection housing 61 placed in the hollow space defined by the projection 31. The IC board is also connected through an enamel covered wire to a buzzer 7 arranged outside the main case 2.

When the inner case 3 and the IC board 6 are assembled within the main case 2, a heat sensing plate 5 is attached to the rear end of the main case 2 by a waterproof glue. The plate 5 is covered and reinforced by a transparent cover 4. Thus, the inner case 3, the IC board 6, and the heat sensitive resistor 62 are enclosed within the main case 2.

The heat sensing plate 5 is commercially available. There is a plurality of color reaction areas 51 on the plate 5. Numerals within a predetermined range, for example, +3° to −3°, of the babies' normal body temperature are printed on each of the areas 51. These areas have different colors, for example, a green color for indicating the normal temperature, a blue color for indicating a temperature exceeding a predetermined warning temperature, and a brown color for indicating a temperature under the warning temperature. Thereby, when the heat sensing plate 5 is responsive to the heat within the main case 2, The body temperature of the baby who is sucking the nipple can be correctly indicated by a corresponding color reaction area 51.

On a central portion of the outer side of the transparent cover 4 is attached a buzzer 7 which is in connection with the IC board 6 in the main case 2.

A transparent convex housing 8 is adhered to the rear end of the base 1 to enclose the above-mentioned components between the housing 8 and the base 1. The housing 8 is formed into a convex disk shape so that it has a magnification function and is formed with an opening 82 at the center thereof. The housing 8 is also formed with a plurality of sound releasing openings 81. A base 92 of a handle 9 can be engaged in the opening 82. The color reaction of the areas 51 on the heat sensing plate can be observed in their magnified state through the transparent convex housing 8.

The handle 9 can be formed in a ring or any other appropriate shape for holding by hand and is made of a pliable emulsion colloid. The handle 9 is attached with a battery seat 91. A mercury battery or any other small battery 93 can be disposed within the seat 91. Adjacent the seat 91 is an engaging base 92 which can be pressed and retained in the opening 82. The battery 93 supplies the electric energy required by the IC board 6, the heat sensitive resistor 62, and the alarm buzzer 7.

Figure 4:
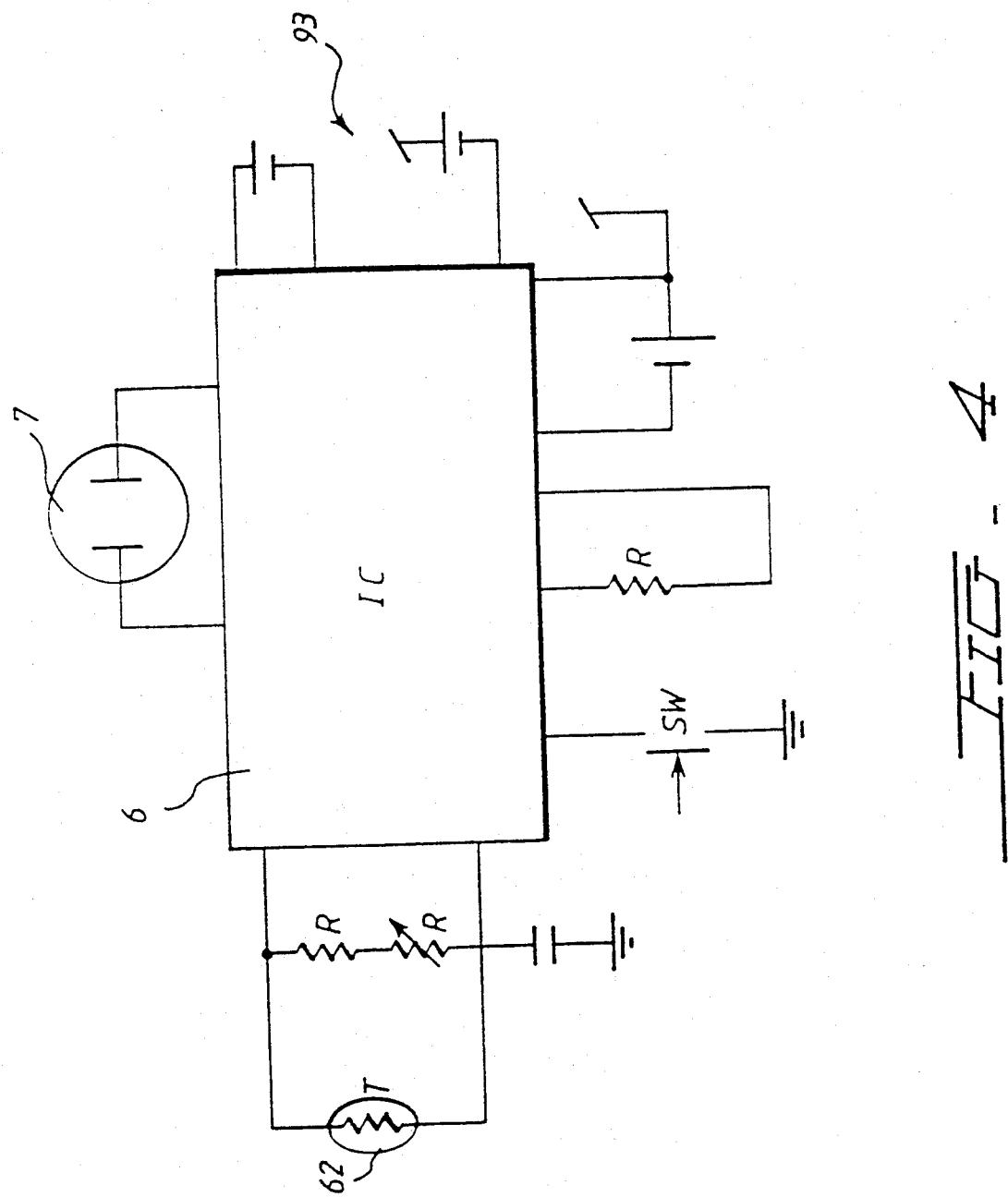
FIG. 4 is a schematic view showing the circuit used in the assembly in accordance with the invention.

A liquid 12 of good heat conductivity can be filled within the sealed space defined by the base 1, the main case 2, the transparent cover 4, and the heat sensing plate 5 so that heat can be transferred from the mouth of the baby through the nipple 11 of the base 1 to the liquid 12 within the nipple 11. When the nipple 11 is sucked and pressed by the baby's mouth, the liquid therein will flow in the sealed space by passing through the liquid guiding openings 32 and thus the heat in the liquid can be transferred to the heat sensing plate 5 on the inner side of the transparent cover 4 so that the temperature of the liquid can be indicated by one of the heat reaction areas 51. Futhermore, when the heat coductive liquid 12 reaches a predetermined warning temperature, a signal from the heat sensitive resistor 62 will be sent through the IC board 6 to the alarm buzzer 7. Thus, the buzzer 7 is energized and issues a sound through the sound releasing openings 81 in the convex cover 8 to attract the attention of the person who cares for the baby. The circuit in accordance with the invention is schematically shown in FIG. 4.

While only one preferred embodiment of the invention has been shown and described, it will be understood that this invention is not limited thereto since modifications can be made and will become apparent to those skilled in the art.

I claim:

1. A nipple assembly comprising:
   (a) a hollow base provided with a nipple and including an opening on one side of the base;
   (b) a thin shell pot-shaped main case having an open end, an inwardly extending circular flange, and a central hole therethrough, a plurality of glue pits formed on an outer circumference of the flange for receiving waterproof glue to attach the main case to the base;
   (c) a thin shell inner case having a cylindrical hollow projection and a flange, a plurality of liquid guiding slots formed through a wall of the hollow projection, and the hollow projection being receivable within the central hole of the main case;
   (d) a heat sensing plate provided with a plurality of heat reaction areas through which the temperature of a heat conductive liquid can be indicated, the heat sensing plate being secured to a rear end of the main case;
   (e) an IC board and a heat sensitive resistor;
   (f) a transparent cover enclosing the heat sensing plate, IC board and heat sensitive resistor within the main case;
   (g) a circular waterproof cover secured to an inner circumference of the main case by waterproof glue around the circumference of the cover to define a sealed space between the cover and hollow base, and the sealed space being filled with a heat conductive liquid; and
   (h) an alarm buzzer, an energy source for powering the alarm buzzer, whereby when the temperature of the heat conductive liquid reaches a predetermined level, a signal from the heat sensitive resistor is sent through the IC board to activate the alarm buzzer and provide a warning to a person caring for a baby using the nipple assembly.

* * * * *